US008952956B2

(12) United States Patent
Sato et al.

(10) Patent No.: US 8,952,956 B2
(45) Date of Patent: Feb. 10, 2015

(54) COMPUTER-READABLE STORAGE MEDIUM HAVING STORED THEREIN DISPLAY CONTROL PROGRAM, DISPLAY CONTROL APPARATUS, DISPLAY CONTROL SYSTEM, AND DISPLAY CONTROL METHOD

(75) Inventors: Katsuhisa Sato, Kyoto (JP); Masahiro Nakamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 674 days.

(21) Appl. No.: 13/029,282

(22) Filed: Feb. 17, 2011

(65) Prior Publication Data
US 2012/0154377 A1   Jun. 21, 2012

(30) Foreign Application Priority Data
Dec. 16, 2010   (JP) ................. 2010-279994

(51) Int. Cl.
G06T 15/00  (2011.01)
G06T 19/00  (2011.01)
G06F 3/0481  (2013.01)
A63F 13/40  (2014.01)

(52) U.S. Cl.
CPC ............ *G06T 19/00* (2013.01); *G06F 3/04815* (2013.01); *A63F 2300/6661* (2013.01); *A63F 2300/6045* (2013.01); *A63F 13/10* (2013.01); *A63F 2300/301* (2013.01); *A63F 2300/1075* (2013.01); *A63F 2300/8058* (2013.01); *A63F 2300/204* (2013.01)
USPC ......................................................... 345/419

(58) Field of Classification Search
USPC ......................................................... 345/419
See application file for complete search history.

(56) References Cited

U.S. PATENT DOCUMENTS 7,843,429 B2   11/2010  Pryor
8,384,770 B2    2/2013  Konno et al.
8,456,466 B1*   6/2013  Reisman et al. .............. 345/419
8,512,152 B2    8/2013  Ehara et al.

(Continued)

FOREIGN PATENT DOCUMENTS

JP   04-180180   6/1992
JP   9-74573     3/1997

(Continued)

OTHER PUBLICATIONS

Wu, et al., Picking and Snapping for 3D Input Devices, Proceedings of the XVI Brazilian Symposium on Computer Graphics and Image Processing (SIBGRAPI'03), 2003.*

(Continued)

*Primary Examiner* — Kee M Tung
*Assistant Examiner* — Haixia Du
(74) *Attorney, Agent, or Firm* — Nixon & Vanderhye P.C.

(57) ABSTRACT

A game apparatus acquires a designated position Q, on an image, which corresponds to a touch position T detected by a touch panel, and a depth value of the designated position Q. A game apparatus calculates a designated three-dimensional position P in a three-dimensional virtual space, based on the designated position Q on the image and the depth value. The game apparatus next determines an orientation of a cursor object to arrange the cursor object at the calculated designated three-dimensional position P. The game apparatus next uses a virtual camera to take an image of the virtual space including the cursor object, and displays the image on an upper LCD.

20 Claims, 11 Drawing Sheets

(56) References Cited

U.S. PATENT DOCUMENTS

| | | |
|---|---|---|
| 2002/0008906 A1 | 1/2002 | Tomita |
| 2004/0223049 A1 | 11/2004 | Taniguchi et al. |
| 2007/0111803 A1 | 5/2007 | Moro et al. |
| 2008/0070684 A1 | 3/2008 | Haigh-Hutchinson |
| 2008/0199046 A1 | 8/2008 | Sasagawa et al. |
| 2008/0222555 A1 | 9/2008 | Coyne |
| 2008/0225007 A1 | 9/2008 | Nakadaira et al. |
| 2008/0240549 A1 | 10/2008 | Koo et al. |
| 2009/0275366 A1 | 11/2009 | Schilling |
| 2009/0278764 A1 | 11/2009 | Kuwahara et al. |
| 2009/0278974 A1 | 11/2009 | Kuwahara et al. |
| 2009/0295743 A1 | 12/2009 | Nakajoh |
| 2010/0033429 A1* | 2/2010 | Olivan Bescos ............... 345/157 |
| 2010/0115455 A1* | 5/2010 | Kim ............................... 715/781 |
| 2011/0157159 A1* | 6/2011 | Chen et al. ..................... 345/419 |
| 2011/0175928 A1* | 7/2011 | Hashimoto .................... 345/629 |
| 2011/0185299 A1 | 7/2011 | Hinckley et al. |
| 2011/0209102 A1 | 8/2011 | Hinckley et al. |
| 2011/0209104 A1 | 8/2011 | Hinckley et al. |
| 2011/0221750 A1 | 9/2011 | Sato et al. |

FOREIGN PATENT DOCUMENTS

| | | |
|---|---|---|
| JP | 09-192349 | 7/1997 |
| JP | 09-201472 | 8/1997 |
| JP | 2002-223458 | 8/2002 |
| JP | 2002-281526 | 9/2002 |
| JP | 2003-067784 | 3/2003 |
| JP | 2003-107603 | 4/2003 |
| JP | 2003-264851 | 9/2003 |
| JP | 2003-348621 | 12/2003 |
| JP | 2004-109330 | 4/2004 |
| JP | 2004-287902 | 10/2004 |
| JP | 2005-073038 | 3/2005 |
| JP | 2005-110120 | 4/2005 |
| JP | 2005-218779 | 8/2005 |
| JP | 2006-33476 | 2/2006 |
| JP | 2007-256960 | 10/2007 |
| JP | 2008-068060 | 3/2008 |
| JP | 4358181 | 8/2009 |
| JP | 2009-223904 | 10/2009 |
| JP | 2009-278456 | 11/2009 |
| WO | 2008/013352 | 1/2008 |

OTHER PUBLICATIONS

Oct. 1, 2012, European Search Report for EP 11150625.9, 9 pages.

Jun. 8, 2012 Office Action in U.S. Appl. No. 13/006,055, 10 pages.

* cited by examiner

COMPUTER-READABLE STORAGE MEDIUM HAVING STORED THEREIN DISPLAY CONTROL PROGRAM, DISPLAY CONTROL APPARATUS, DISPLAY CONTROL SYSTEM, AND DISPLAY CONTROL METHOD

CROSS REFERENCE TO RELATED APPLICATION

The disclosure of Japanese Patent Application No. 2010-279994, filed on Dec. 16, 2010, is incorporated herein by reference.

BACKGROUND OF THE INVENTION

1. Field of the Invention

The present invention relates to a display control program, a display control apparatus, a display control system, and a display control method, for displaying an object at a position designated by a user.

2. Description of the Background Art

Conventionally, there are game apparatuses in which a touch panel provided on a screen detects a touch position and a designated virtual space position is detected based on the detected touch position. For example, an apparatus disclosed in Japanese Patent No. 4358181 (Patent Literature 1) calculates a straight line extending in a viewing direction of a virtual camera, from a virtual space position, on a plane, which corresponds to the touch position detected by the touch panel on the screen. A virtual space character, which intersects or contacts with the calculated straight line, is determined to be the touched character, and a point of intersection with the straight line is determined to be the virtual space position designated by the user.

Methods as described in Patent Literature 1, however, require complex calculations to calculate a virtual space position corresponding to a position designated by a user, and display an object at the virtual space position. That is, in such a geometric method as described above, to calculate the virtual space position corresponding to the position designated by the user, it is required to calculate a straight line in the virtual space and a point of intersection between the straight line and a virtual space model. Therefore, the calculation becomes complex, which may cause an increase in processing burden of an apparatus.

SUMMARY OF THE INVENTION

Therefore, an object of the present invention is to provide a display control technology, which requires no complex calculation, for easily displaying an object at a virtual space position corresponding to a position designated by a user.

In order to achieve the object, the present invention employs the following features.

An embodiment of the present invention is a computer-readable storage medium having stored therein a display control program executed by a computer of a display control apparatus. The display control program causes the computer to function as: image generating means; acquisition means; calculation means; object arranging means; and display control means. The image generating means generates an image, of which depth values are set, by taking an image of a three-dimensional virtual space by a virtual camera. The acquisition means acquires the depth value of the image at a designated position designated on the image by a user by use of position designating means. The calculation means calculates based on the depth value of the image, which is acquired by the acquisition means, a position in a depth direction in the virtual space viewed from the virtual camera. The object arranging means arranges an object at the position, in the depth direction, which is calculated by the calculation means. The display control means displays, on a display area, an image taken of the virtual space including the object arranged therein by object arranging means.

According to the above configuration, the image generating means generates an image obtained by taking an image of the virtual space by the virtual camera. The depth values are set in the generated image. The acquisition means acquires the depth value on the image at the designated position designated on the image by the user by use of the position designating means. The position in the depth direction in the virtual space is calculated based on the acquired depth value on the image. Then, the object can be arranged at the calculated position in the depth direction, and displayed on the display area. For example, the user designates the position by using the position designating means, such as a touch panel, or a touch pad. Then, the position in the depth direction in the virtual space can be calculated by using the depth value of the image, and the object can be arranged at the position in the depth direction. Therefore, the position in the depth direction of the three-dimensional virtual space, which corresponds to the position designated on a two-dimensional plane by using the position designating means, can be calculated without the necessity of complex calculations, and the object can be arranged at the position in the three-dimensional virtual space.

Further, in another configuration of the present invention, the calculation means may calculate the designated three-dimensional position in the virtual space, based on the designated position on the image, and the depth value of the image at the designated position. The object arranging means arranges the object at the designated three-dimensional position calculated by the calculation means.

According to the above configuration, the designated three-dimensional position in the virtual space can be calculated based on the designated position on the image and the depth value, and the three-dimensional position in the virtual space, which corresponds to the position designated by the user by using the position designating means, can be easily calculated.

Further, in another configuration of the present invention, the calculation means may calculate, based on the designated position on the image, positions in up-down and left-right directions in the virtual space viewed from the virtual camera, and calculate, based on the depth value of the image, the position in the depth direction in the virtual space viewed from the virtual camera. Therefore, the calculation means calculates the designated three-dimensional position in the virtual space.

According to the above configuration, for example, in the case where an coordinate system of the virtual camera is set such that a Z axis is in an imaging direction of the virtual camera, an X axis is in the right direction of the imaging direction, and a Y axis is in the up direction of the imaging direction, X-, Y-, and Z-coordinate values can be calculated. Specifically, the X-Y coordinate values in the camera coordinate system can be calculated based on the designated position, and the Z-coordinate value in the camera coordinate system can be calculated based on the depth value.

Further, in another configuration of the present invention, the object may be a designating object, which indicates the position designated by the user.

According to the above configuration, the user is able to easily understand the position in the virtual space, which corresponds to the position designated by the user.

Further, in another configuration of the present invention, a second object to be displayed may be arranged in the virtual space. In this case, the image generating means generates an image by taking, by the virtual camera, an image of the virtual space including the second object. In the case where the designated position exists in an area in which the second object is displayed, the object arranging means determines, based on the designated three-dimensional position, an orientation of the designating object, and arranges in the virtual space the designating object in the determined orientation.

According to the above configuration, the second object is arranged in the virtual space. In the ease where the designated position exists in a display area of the second object, the orientation of the designating object can be determined based on the designated three-dimensional position. For example, the orientation of the designating object in the virtual space can be determined depending on the designated three-dimensional position in the display area of the second object. Therefore, for example, the orientation of the designating object can be changed according to a shape and the designated position of the second object.

Further, in another configuration of the present invention, the second object may be formed of a plurality of parts. In this case, the display control program further causes the computer to function as: part determining means for determining, based on the designated position, a designated part from among the plurality of parts of the second object. The object arranging means determines the orientation of the designating object, according to the designated part, and arranges in the virtual space the designating object in the determined orientation.

According to the above configuration, the orientation of the designating object can be changed based on the designated part from among the plurality of parts of the second object.

Further, in another configuration of the present invention, the object arranging means may determine the orientation of the designating object, according to a normal line of the designated part at the designated three-dimensional position.

According to the above configuration, the orientation of the designating object can be determined according to the normal line of the designated part at the designated three-dimensional position. For example, in the case where the designating object is arranged so as to be normal to the normal line, the designating object can be displayed so as to be along a surface of the designated part of the second object. Therefore, the user can obtain a visual sensation of tapping the second object, for example.

Further, in another configuration of the present invention, each of the plurality of parts of the second object may be formed of a bone formed of either of a point and a line segment. In this case, the object arranging means calculates a normal vector extending from a point on the bone, at which a distance between the designated three-dimensional position and the bone is shortest, toward the designated three-dimensional position, and determines the orientation of the designating object, according to the normal vector.

According to the above configuration, the normal line of the designated part can be calculated by a simple calculation, and the orientation of the designating object can be determined according to the normal line.

Further, in another configuration of the present invention, the display control program may further cause the computer to function as: angle setting means for setting an angle of rotation of the designating object, according to the designated three-dimensional position relative to the designated part. The object arranging means rotates the designating object about the normal line by the angle of rotation to arrange the designating object in the virtual space.

According to the above configuration, the designating object can be rotated about the normal line. For example, the designating object can be turned upside down in the case where a point is designated in the upper side area in the area of the designated part, and the case where a point is designated in the lower side area in the area of the designated part, thereby giving the user a feel of tapping the second object.

Further, in another configuration of the present invention, the display control means may display the designating object in different modes, depending on whether or not the designated position exists within the area in which the second object is displayed.

According to the above configuration, the designating object can be displayed in the different modes, depending on whether or not the designated position exists within the area in which the second object is displayed. For example, in the case where the designated position does not exist within the area in which the second object is displayed, a shape of the designating object can be changed to an arrow shape, and in the case where the designated position exists within the area in which the second object is displayed, the shape of the designating object can be changed to a hand shape. Therefore, the user can easily determine whether or not the second object is designated.

Further, in another configuration of the present invention, in the case where the designated position exists within the area in which the second object is displayed, the calculation means may calculate the designated three-dimensional position in the virtual space, based on the designated position and the depth value of the image, at the designated position. Also, in the case where the designated position exists outside of the area in which the second object is displayed, the calculation means calculates the designated three-dimensional position in the virtual space, based on the designated position and a constant depth value.

According to the above configuration, in the ease where the designated position exists within the display area of the second object, the designated three-dimensional position is calculated by using the depth value of the image at the designated position. In the case where the designated position does not exist in the display area of the second object, the designated three-dimensional position is calculated by using the constant depth value. Therefore, in the case where the designated position exists within the display area of the second object, the designating object can be arranged according to the position (the position in the depth direction) of the second object. Also, in the case where the designated position does not exist in the display area of the second object, the designating object can be arranged at a position spaced apart a predetermined distance from the screen.

Further, in another configuration of the present invention, the display area may be displayable in a stereoscopically visible manner. In this case, the image generating means generates an image for a left eye and an image for a right eye by taking images of the virtual space by a virtual stereo camera. The acquisition means acquires either of a depth value at the designated position on the image for the left eye or the image for the right eye, and a depth value at the designated position on a third image acquired by taking an image of the virtual space by a third virtual camera having the same imaging direction as that of the virtual stereo camera. The display control means stereoscopically displays, on the display area, an image taken of the virtual space including the object arranged therein by the object arranging means.

According to the above configuration, the virtual space and the object can be displayed stereoscopically. In the case where the object is displayed stereoscopically, the object position in the virtual space needs to be accurately obtained, and thereby the object needs to be arranged in the virtual space. In the method as described above which uses the depth value, the position in the virtual space, which corresponds to the position designated by the user, can be accurately and easily obtained.

Further, in another configuration of the present invention, the third virtual camera may be set between a virtual camera at the left and a virtual camera at the right which are components of the virtual stereo camera. The acquisition means acquires the depth value of the third image at the designated position on the third image. The calculation means calculates the designated three-dimensional position, based on the designated position on the third image and the depth value of the third image.

According to the above configuration, the third virtual camera is set between a virtual camera at the left and a virtual camera at the right which are the components of the virtual stereo camera. Then, the designated three-dimensional position is calculated based on the designated position on the image taken by the third virtual camera, and the depth value at the designated position, and the object is arranged at the designated three-dimensional position. If the designated three-dimensional position is calculated by using either of the image for the left eye and the image for the right eye, which are taken by the virtual stereo camera, the designated three-dimensional position corresponding to the position designated by the user cannot be accurately obtained because there is parallax between these two images. However, calculating the designated three-dimensional position by using the image taken by the third virtual camera set between the virtual cameras at the left and at the right, which are the components of the virtual stereo camera, allows an accurate calculation of the designated three-dimensional position without the effects of the parallax.

Further, in another configuration of the present invention, the third virtual camera may be set at the middle between the virtual camera at the left and the virtual camera at the right which are the components of the virtual stereo camera.

According to the above configuration, the designated three-dimensional position corresponding to the position designated by the user can be accurately obtained.

Further, in another configuration of the present invention, the position designating means may be provided on a second display area, which is different from the display area, and detects a touch position on the second display area. The acquisition means acquires a depth value on an image displayed on the second display area at a designated position corresponding to the touch position detected by the position designating means. The display control means displays, on the display area, the image taken of the virtual space including the object arranged therein by the object arranging means, and displays, on the second display area, an image taken of the virtual space.

According to the above configuration, the user touches the image displayed on the second display area, thereby arranges the object at the position in the three-dimensional virtual space, which corresponds to the touch position. Therefore, the object can be displayed on the display area. For example, in the case where the display area and the second display area are provided on the upper side and the lower side, respectively, a touch operation of the display area on the lower side can be performed. Then, the object can be arranged at the position in the virtual space, which corresponds to the touch position on the lower display area, and the object can be displayed on the upper display area.

Further, in another configuration of the present invention, the position designating means may be provided on a second display area, which is different from the display area, and detect a touch position on the second display area. The display control program further causes the computer to function as: third image generating means for generating a third image which is acquired by taking an image of the virtual space by a third virtual camera having the same imaging direction as that of the virtual stereo camera. The acquisition means acquires a depth value on the third image at a designated position corresponding to the touch position detected by the position designating means. The display control means displays, on the display area, the image for the left eye and the image for the right eye generated by the image generating means, and displays, on the second display area, the third image generated by the third image generating means.

According to the above configuration, for example, the display area (upper screen) is provided on the upper side, the second display area (lower screen) is provided on the lower side and thereby, the touch operation of the lower screen can be performed. Performing the touch operation of the lower screen arranges the object at the position in the three-dimensional virtual space, which corresponds to the touch position, and therefore, the object can be displayed on the upper screen.

Further, the present invention, the display control apparatus may be the realization of the means described above. Alternatively, in the present invention, a plurality of aspects, which realize the above means, may interact with one another, thereby being configured as one display control system. The display control system may be configured of a single apparatus, or may be configured of a plurality of apparatuses.

According to the present invention, an object can be displayed at a position in a virtual space, which corresponds to a position designated by a user, without the necessity of complex calculations.

These and other objects, features, aspects and advantages of the present invention will become more apparent from the following detailed description of the present invention when taken in conjunction with the accompanying drawings.

DESCRIPTION OF THE PREFERRED EMBODIMENTS (Structure of Game Apparatus)

Figure 1:
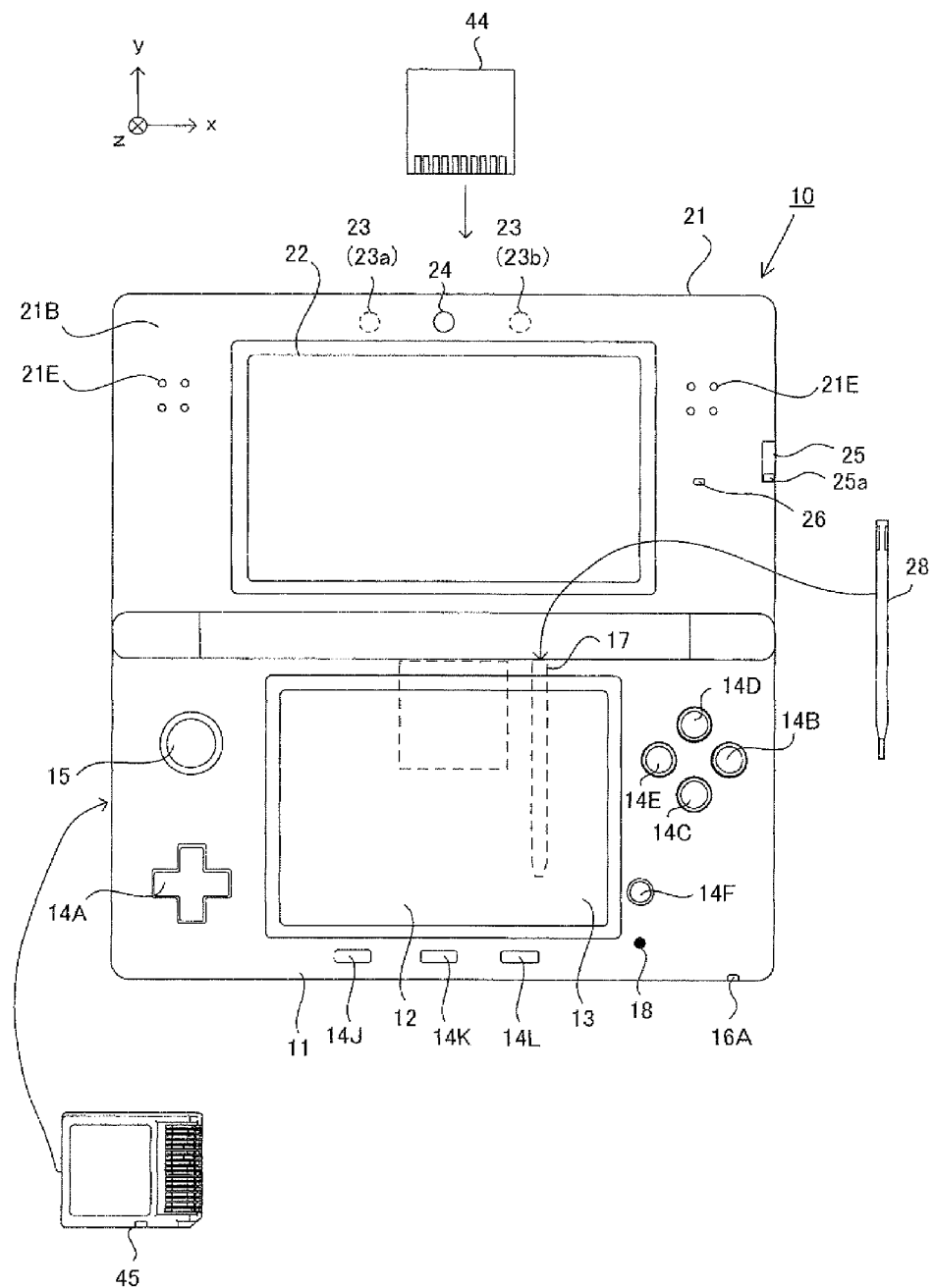
FIG. 1 is a front view showing an external of a game apparatus 10 in an opened state.
Figure 2:
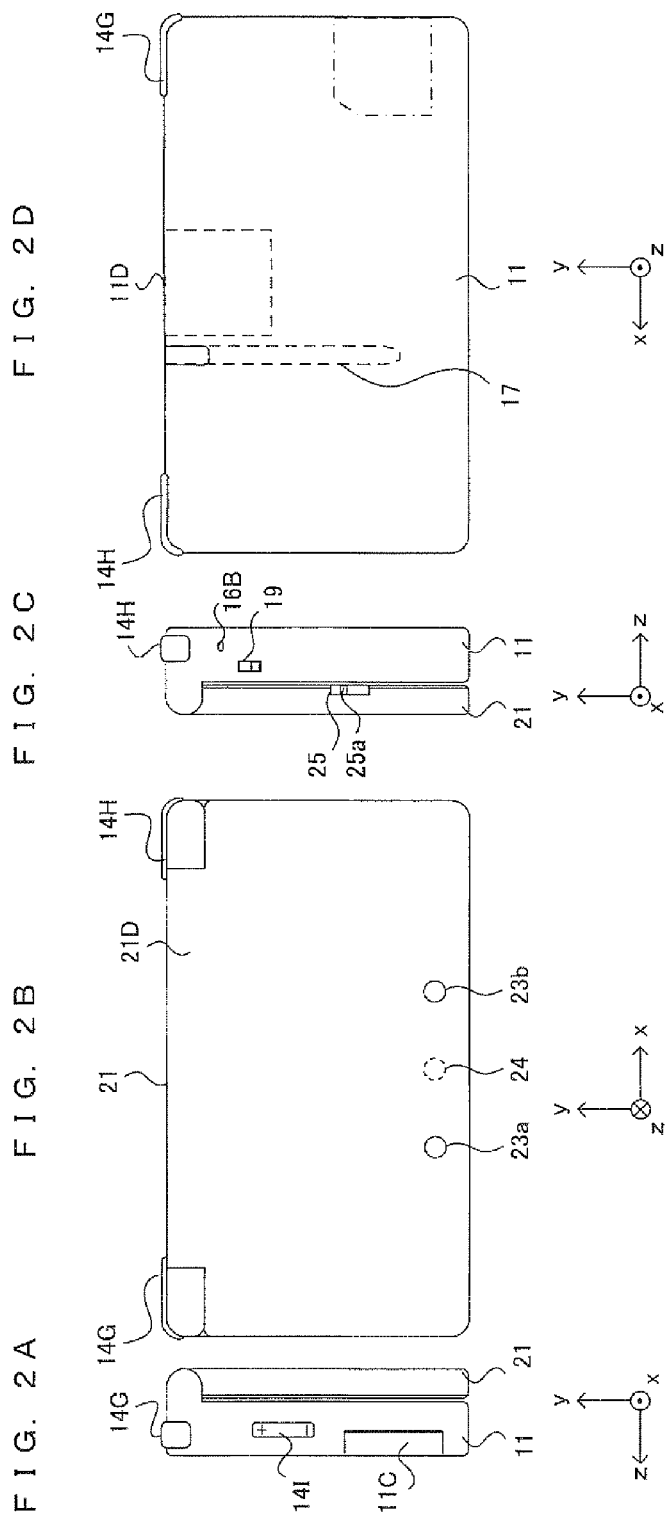
FIG. 2A is a left side view of the game apparatus 10 in a closed state.
FIG. 2B is a front view of the game apparatus 10 in the closed state.
FIG. 2C is a right side view of the game apparatus 10 in the closed state.
FIG. 2D is a rear view of the game apparatus 10 in the closed state.

Hereinafter, a game apparatus according to an embodiment of the present invention will be described. FIG. 1 is a front view showing an external view of a game apparatus 10 in an opened state. FIG. 2A is a left side view of the game apparatus 10 in a closed state, FIG. 2B is a front view of the game apparatus 10 in the closed state, FIG. 2C is a right side view of the game apparatus 10 in the closed state, and FIG. 2D is a rear view of the game apparatus 10 in the closed state. The game apparatus 10 is a hand-held game apparatus, and is configured to be foldable as shown in FIG. 1 to FIG. 2D. FIG. 1 shows the game apparatus 10 in the opened state and FIG. 2A to 2D each show the game apparatus 10 in the closed state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1 to FIG. 2D. The game apparatus 10 includes a lower housing 11 and an upper housing 21 as shown in FIG. 1 to FIG. 2D. The lower housing 11 and the upper housing 21 are connected to each other so as to be openable and closable (foldable).

(Description of Lower Housing)

Initially, a structure of the lower housing 11 will be described. As shown in FIG. 1 to FIG. 2D, a lower LCD (Liquid Crystal Display) 12, a touch panel 13, operation buttons 14A to 14L, an analog stick 15, an LED 16A and an LED 16B, an insertion opening 17, and a microphone hole 18 are provided in the lower housing 11. Hereinafter, these components will be described in detail.

As shown in FIG. 1, the lower LCD 12 is accommodated in the lower housing 11. The number of pixels of the lower LCD 12 may be, for example, 320 dots×240 dots (the horizontal line×the vertical line). The lower LCD 12 is a display device for displaying an image in a planar manner (not in a stereoscopically visible manner), which is different from the upper LCD 22 described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 is, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 2D) is provided on the upper side surface of the lower housing 11. The insertion opening 17 is used for accommodating a touch pen 28 which is used for performing an operation of the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among the operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The buttons 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which is configured to slide parallel to the inner side surface of the lower housing 11. The analog stick 15 acts in accordance with a program executed by the game apparatus 10. For example, when a game in which a predetermined object emerges in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone 42 (see FIG. 3) is provided as a sound input device described below, and the microphone 42 detects for a sound from the outside of the game apparatus 10.

As shown in FIG. 2B and FIG. 2D, an L button 14G and an R button 14H are provided on the upper side surface of the lower housing 11. The L button 140 and the R button 14H act as shutter buttons (imaging instruction buttons) of the imaging section, for example. Further, as shown in FIG. 2A, a sound volume button 14I is provided on the left side surface of the lower housing 11. The sound volume button 14I is used for adjusting a sound volume of a speaker of the game apparatus 10.

As shown in FIG. 2A, a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in FIG. 2D, an insertion opening 11D, through which an external memory 44 having a game program stored therein is inserted, is provided on the upper side surface of the lower housing 11, and a connector (not shown) for electrically connecting between the game apparatus 10 and the external memory 44 in a detachable manner is provided inside the insertion opening 11D. A predetermined game program is executed, by connecting the external memory 44 to the game apparatus 10.

Further, as shown in FIG. 1 and FIG. 2C, the first LED 16A for notifying a user of an ON/OFF state of a power supply of the game apparatus 10 is provided on the lower side surface of the lower housing 11, and the second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE 802.11.b/g standard. A wireless switch 19 for enabling/disabling the function of the wireless communication is provided on the right side surface of the lower housing 11 (see FIG. 2C).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 to FIG. 2D, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area. Specifically, the upper LCD 22 is a display device using a method in which the image for a left eye and the image for a right eye are alternately displayed in the horizontal direction in predetermined units (for example, every other line). Alternatively, the upper LCD 22 may be a display device using a method in which the image for a left eye and the image for a right eye are alternately displayed for a predetermined time period and the image for a left eye and the image for a right eye are viewed by the left eye and the right eye, respectively, by using glasses. In the present embodiment, the upper LCD 22 is a display device capable of displaying an image which is stereoscopically visible by the naked eye, and a lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible by the naked eye. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. That is, a display mode is used in which the same displayed image is viewed with the left eye and the right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. The outer imaging section (left) 23a and the outer imaging section (right) 23b can be used as a stereo camera depending on a program executed by the game apparatus 10. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. A slider 25a of the 3D adjustment switch 25 is slidable to any position in a predetermined direction (along the longitudinal direction of the right side surface), and a display mode of the upper LCD 22 is determined in accordance with the position of the slider 25a. Further, a manner in which the stereoscopic image is visible is adjusted in accordance with the position of the slider 25a. Specifically, an amount of deviation in the horizontal direction between a position of an image for a right eye and a position of an image for a left eye is adjusted in accordance with the position of the slider 25a.

The 3D indicator 26 indicates whether or not the upper LCD 22 is in the stereoscopic display mode. The 3D indicator 26 is implemented as an LED, and is lit up when the stereoscopic display mode of the upper LCD 22 is enabled. The 3D indicator 26 may be lit up only when the program processing for displaying a stereoscopically visible image is performed in a state where the upper LCD 22 is in the stereoscopic display mode.

Further, a speaker hole 21E is provided on the inner side surface of the upper housing 21. A sound is outputted through the speaker hole 21E from a speaker 43 described below.

(Internal Configuration of Game Apparatus 10)

Figure 3:
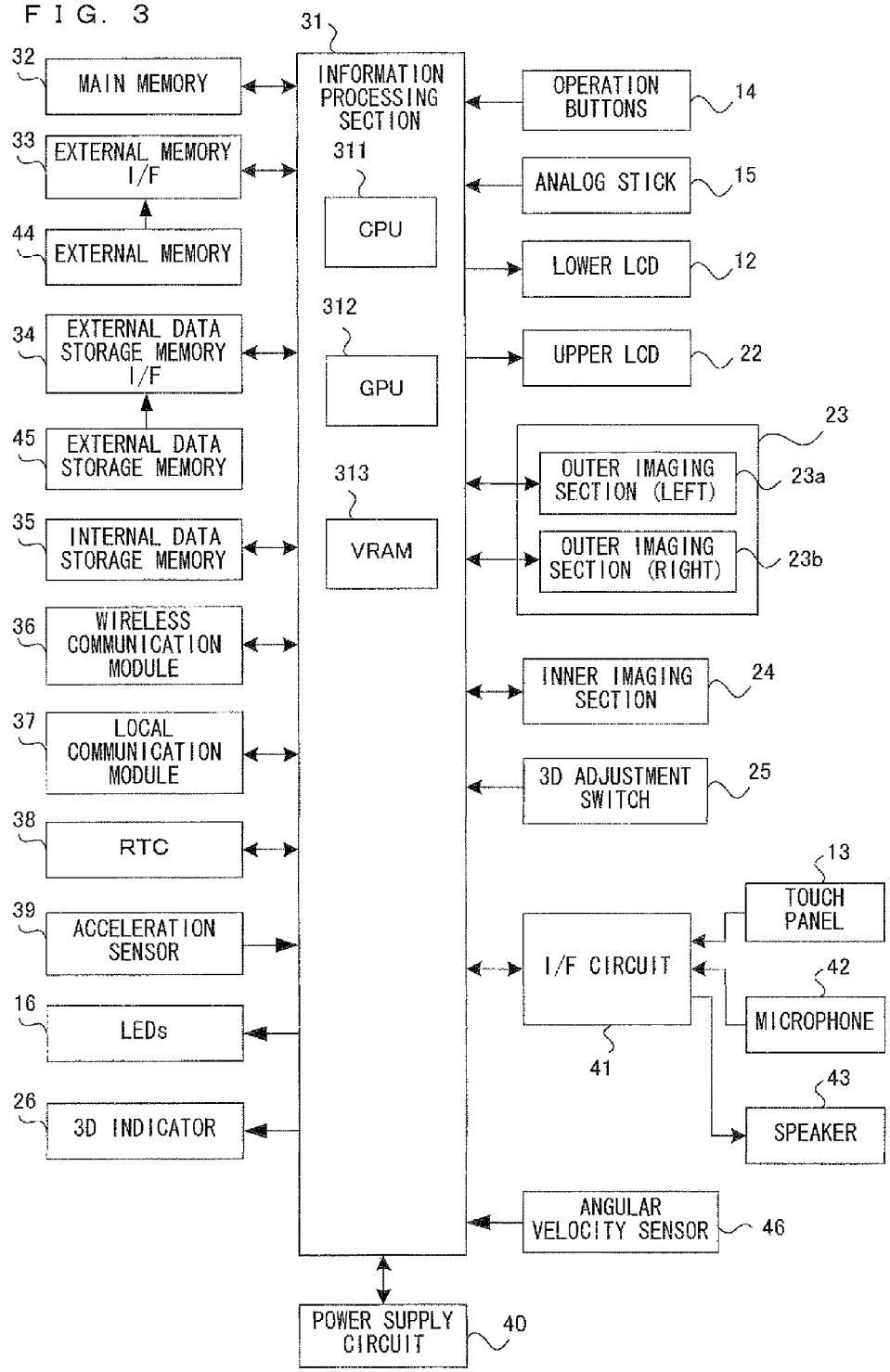
FIG. 3 is a block diagram illustrating an internal configuration of the game apparatus 10.

Next, an internal electrical configuration of the game apparatus 10 will be described with reference to FIG. 3. FIG. 3 is a block diagram illustrating an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a process according to the program by executing a program stored in a memory (for example, the external memory 44 connected to the external memory I/F 33 or the internal data storage memory 35) inside the game apparatus 10. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the process based on the program, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through wireless communication via the wireless communication module 36 are stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, communication through a unique protocol, or infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of acceleration for one axial direction or two axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time, and outputs the time to the information processing section 31. The information processing section 31 calculates a current time (date), based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier (not shown). The microphone 42 detects user's voice, and outputs a sound signal to the I/F circuit 41. The amplifier amplifies the sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data, based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data to recognize a position on which an input is made on the touch panel 13.

The operation button 14 includes the operation buttons 14A to 14L described above, and is connected to the information processing section 31. Operation data representing an input state of each of the operation buttons 14A to 14L is outputted from the operation button 14 to the information processing section 31, and the input state indicates whether or not each of the operation buttons 14A to 14L has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 displays a stereoscopic image (stereoscopically visible image) on the upper LCD 22.

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye, which are stored in the VRAM 313 of the information processing section 31, are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed with the user's right eye, and the image for the left eye is viewed with the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits to the information processing section 31 an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode.

Further, the angular velocity sensor 46 is connected to the information processing section 31. The angular velocity sensor 46 detects an angular velocity about each axis (x axis, y axis, and z axis). The game apparatus 10 can calculate an orientation of the game apparatus 10 in real space, in accordance with an angular velocity sequentially detected by the angular velocity sensor 46. Specifically, the game apparatus 10 can calculate an angle of rotation of the game apparatus 10 about each axis by integrating, with time, the angular velocity about each axis, which is detected by the angular velocity sensor 46. This is the end of the description of the internal configuration of the game apparatus 10.

(Outline of Game)

Figure 4:
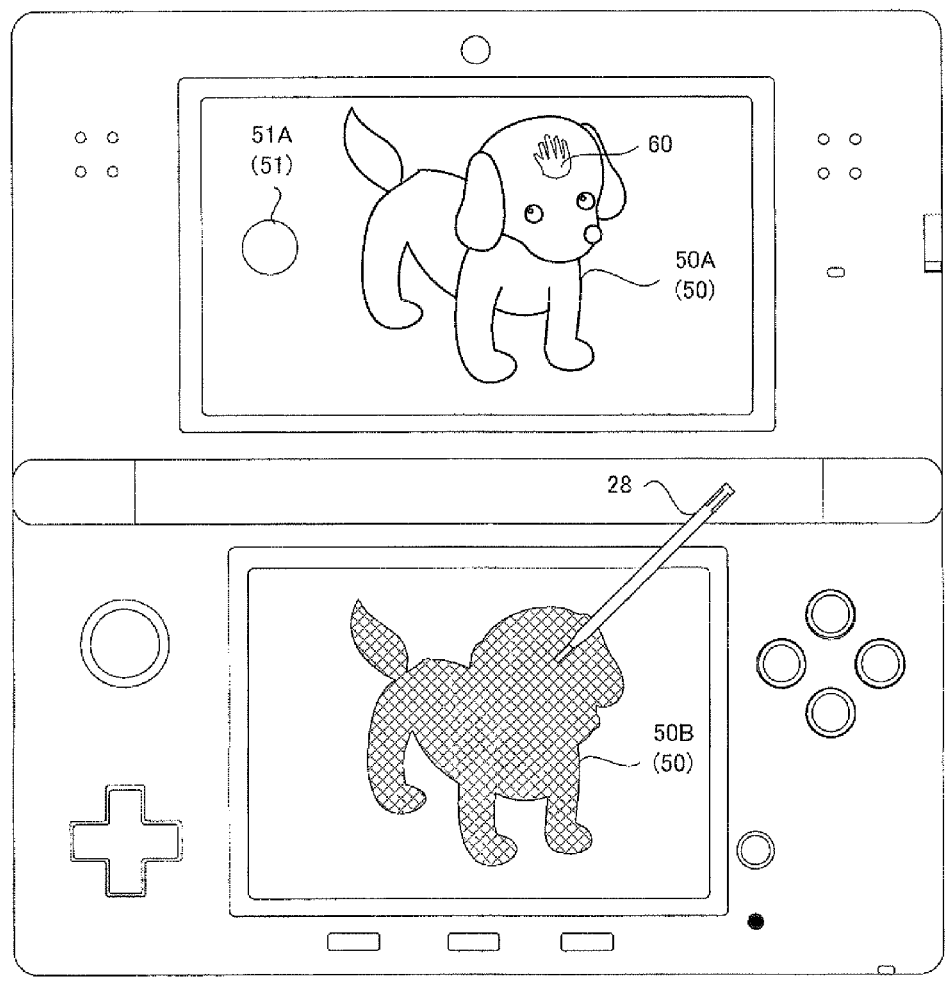
FIG. 4 is a diagram illustrating an example of game images displayed on respective screens of an upper LCD 22 and a lower LCD 12, while a game according to the present embodiment is being executed.

Next, an outline of a game according to an embodiment will be described, with reference to FIG. 4 and FIG. 5. FIG. 4 is a diagram illustrating an example of game images displayed on the respective screens of the upper LCD 22 and the lower LCD 12, while the game according to the present embodiment is being executed. In the game according to the present embodiment, causing a dog object 50 to move in response to a touch operation of the touch panel 13 (the lower LCD 12) gives a user a feel of touching or playing with a dog.

As shown in FIG. 4, on the upper LCD 22, a stereoscopic image 50A is displayed, in which the dog object 50 representing a dog is displayed stereoscopically (displayed in a stereoscopically visible manner). The dog object 50 is a virtual object set in a three-dimensional virtual space (a space represented by XYZ coordinate system (world coordinate system)). The stereoscopic image 50A is an image taken of the dog object 50, which exists in the virtual space, by a virtual stereo camera (virtual cameras at the left and at the right; first and second virtual cameras) set in the virtual space. The image for the left eye and, the image for the right eye are taken by the virtual stereo camera to be displayed on the upper LCD 22, and thereby the dog object 50 is stereoscopically displayed. Also, on the upper LCD 22, a stereoscopic image 51A stereoscopically displaying a ball object 51, which exists in the virtual space, is displayed. The stereoscopic image 50A and the stereoscopic image 51A are displayed in 32 bit color, for example.

On the lower LCD 12, a silhouette image 50B displaying the dog object 50 in a silhouetted manner is displayed. The silhouette image 50B is an image taken of the dog object 50 by a virtual camera (a third virtual camera) set at the middle between the virtual cameras at the left and at the right which are components of the virtual stereo camera), and the dog object 50 is displayed in the image in the silhouetted manner (displayed in a single color). The ball object 51 is not displayed on the lower LCD 12. That is, on the lower LCD 12, merely the dog object 50 to be operated is displayed, and other objects are not displayed.

If the user touches the silhouette image 50B displayed on the lower LCD 12 by using the touch pen 28, a cursor 60 indicating a touched position is displayed on the upper LCD 22. That is, the cursor 60 is displayed on the upper LCD 22 at a position corresponding to the touched position on the lower LCD 12. The cursor 60 is an object representing a human hand. If the user slides the touch pen 28 on the screen while the touch pen 28 is touching the lower LCD 12, the cursor 60 moves according to the movement of the touch pen 28. In addition, the dog object 50 moves according to the movement of the touch pen 28 (the movement of the cursor 60). For example, as shown in FIG. 4, if the user moves the touch pen 28 alternately back and forth in the up-down directions while the head of the dog object 50 is being touched by the touch pen 28, the cursor 60 also moves alternately back and forth in the up-down direction of the upper LCD 22. This movement of the cursor 60 corresponds to the user's action tapping the dog object 50 on the head. In response to the user's action, the dog object 50 behaves like rejoiced in being tapped on the head, for example.

Figure 5:
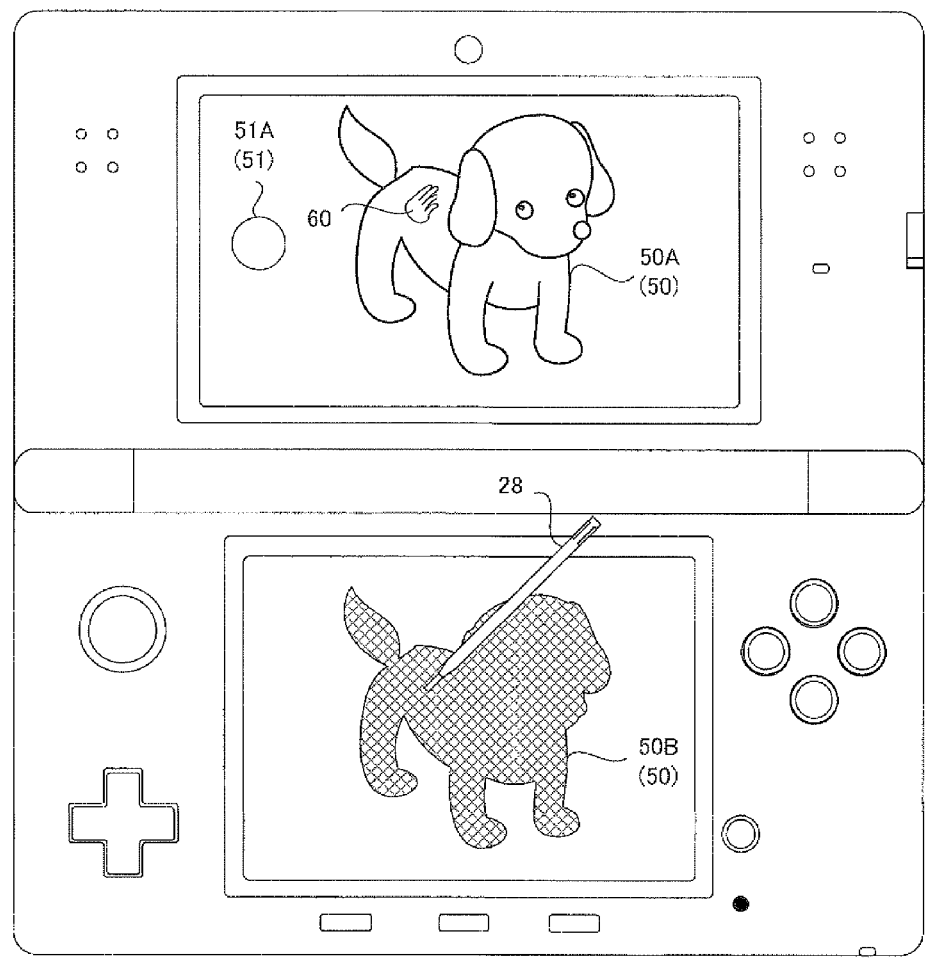
FIG. 5 is a diagram illustrating a state in which a user touches the back area of a dog object 50.

FIG. 5 is a diagram illustrating a state in which the user touches the dog object 50 on the back area. As shown in FIG. 5, if the user touches the dog object 50 on the back area, the orientation of the cursor 60 changes, as compared to the case where the user touches on the head as shown in FIG. 4. Specifically, the cursor 60 is displayed so as to be along a surface of the touched part.

As described above, the user uses the touch pen 28 (or a finger) to touch the silhouette image 50B displayed on the lower LCD 12, and thereby operates the cursor 60 displayed on the upper LCD 22. The user then uses the cursor 60 to touch the dog object 50, and thereby operates the dog object 50.

(Details of Game Process)

Figure 6:
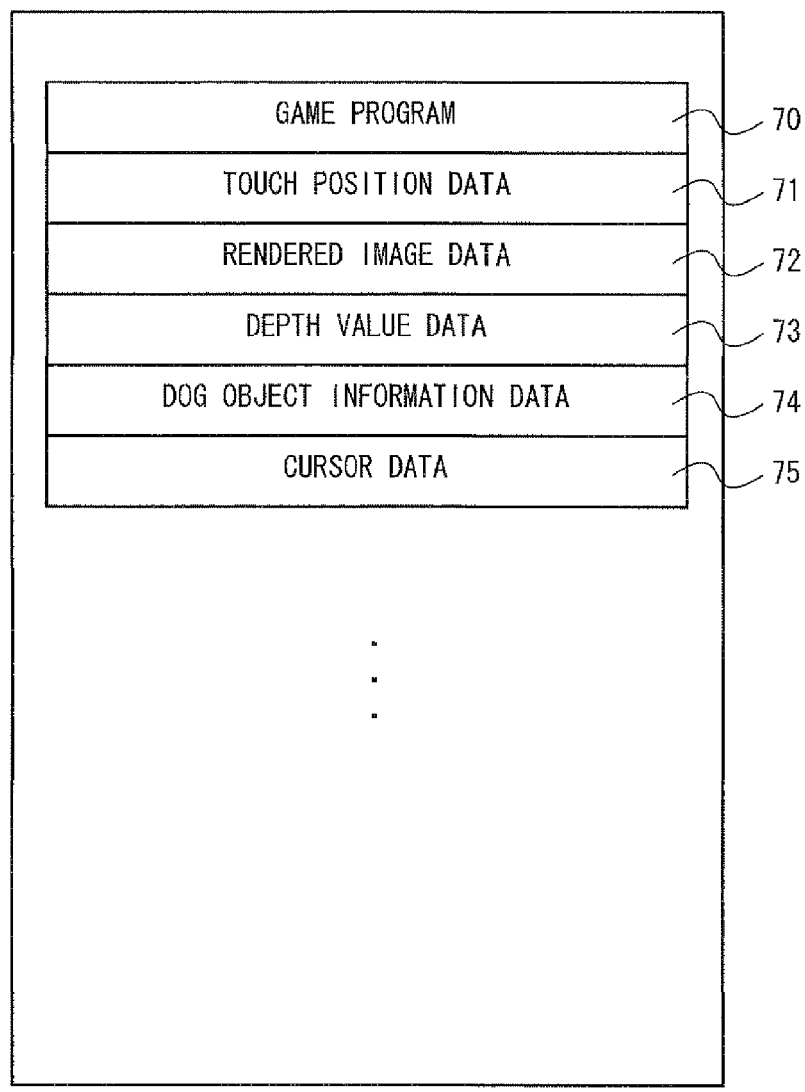
FIG. 6 is a diagram illustrating a memory map of a RAM (such as a main memory 32) of the game apparatus 10.

Next, how to determine the orientation of the cursor 60, and the process thereof in detail will be described, with reference to FIG. 6 to FIG. 8. Initially, a main data which are stored in the main memory 32 and the VRAM 313 (hereinafter, these components may be collectively called RAM) in the game process will be described. FIG. 6 is a diagram illustrating a memory map of the RAM (the main memory 32, or the like) of the game apparatus 10. As shown in FIG. 6, in the RAM, a game program 70, touch position data 71, rendered image data 72, depth value data 73, dog object information data 74, cursor data 75, and the like are stored. Other data stored in the RAM are image data of the dog object 50, data regarding button operations performed by the user, and the like.

The game program 70 is a program for causing the information processing section 31 (the CPU 311) to execute a game process shown in a flowchart described below.

In the touch position data 71, a touch position T detected by the touch panel 13 is stored. Specifically, the touch position data 71 is an array having a given length, and a coordinate value (TxTy coordinate system) representing a position on the touch panel 13 (on the screen of the lower LCD 12) is stored in each element of the array. The TxTy coordinate system is, for example, a coordinate system having as its origin a lower left end of the lower LCD 12, in which a Tx coordinate axis and a Ty coordinate axis are set in the horizontal direction and the vertical direction of the lower LCD 12, respectively. In the touch position data 71, coordinate values, which represents touch positions detected by the touch panel 13, are stored in chronological order.

The rendered image data 72 is data which includes images displayed on the upper LCD 22 and the lower LCD 12. Specifically, the rendered image data 72 includes the image for the left eye and the image for the right eye, which are displayed on the upper LCD 22, and the silhouette image displayed on the lower LCD 12. Each image is generated by a display process described below, and stored in the RAM as the rendered image data 72.

In the depth value data 73, a depth value (a value which represents a position in a depth direction) for each pixel of the image displayed on the lower LCD 12 is stored. Specifically, the depth value data 73 is a two-dimensional array, in which the depth values of the respective pixels of the image displayed on the lower LCD 12 are arranged in a matrix. The depth value for each pixel of the image displayed on the lower LCD 12 is stored in each element of the two-dimensional array.

The dog object information data 74 is data which indicates a position in the virtual space, a shape, or the like of the dog object 50. Specifically, the dog object information data 74 includes information regarding the position of the dog object 50 in the virtual space (the XYZ coordinate system), each part (see FIG. 9) of the dog object 50, and the like.

The cursor data 75 is data which indicates the position in the virtual space and the orientation of the cursor 60. The position of the cursor 60 is the position in the three-dimensional virtual space, which corresponds to the position touched by the user on the touch panel 13. The orientation of the cursor 60 indicates an orientation of the cursor 60 in the virtual space.

(Game Process)

Next, the game process will be described in detail, with reference to FIG. 7 to FIG. 13. FIG. 7 is a main flowchart showing in detail the game process according to the present embodiment. When the game apparatus 10 is powered on, the information processing section 31 (the CPU 311) of the game apparatus 10 executes a boot program stored in the ROM to initialize each unit, such as the main memory 32. Next, the RAM (specifically, the main memory 32) reads the game program 70 stored in a non-volatile memory (the external memory 44 or the like; the computer-readable storage medium), and the CPU 311 of the information processing section 31 starts executing the program. The information processing section 31 (the CPU 311 or the GPU 312) performs the process shown in the flowchart in FIG. 7 after the completion of the above-mentioned process.

Figure 7:
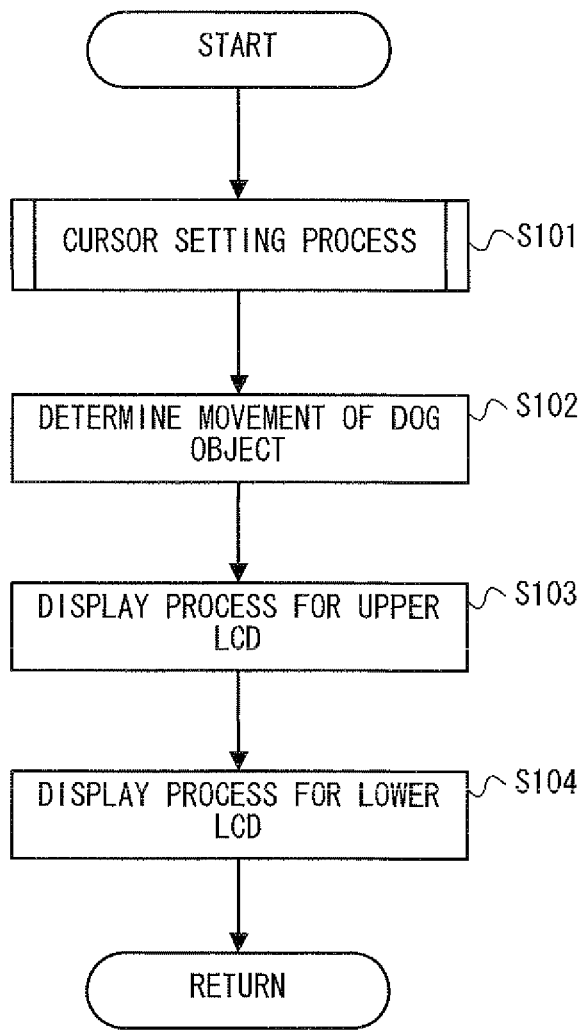
FIG. 7 is a main flow chart showing in detail a game process according to the present embodiment.
Figure 8:
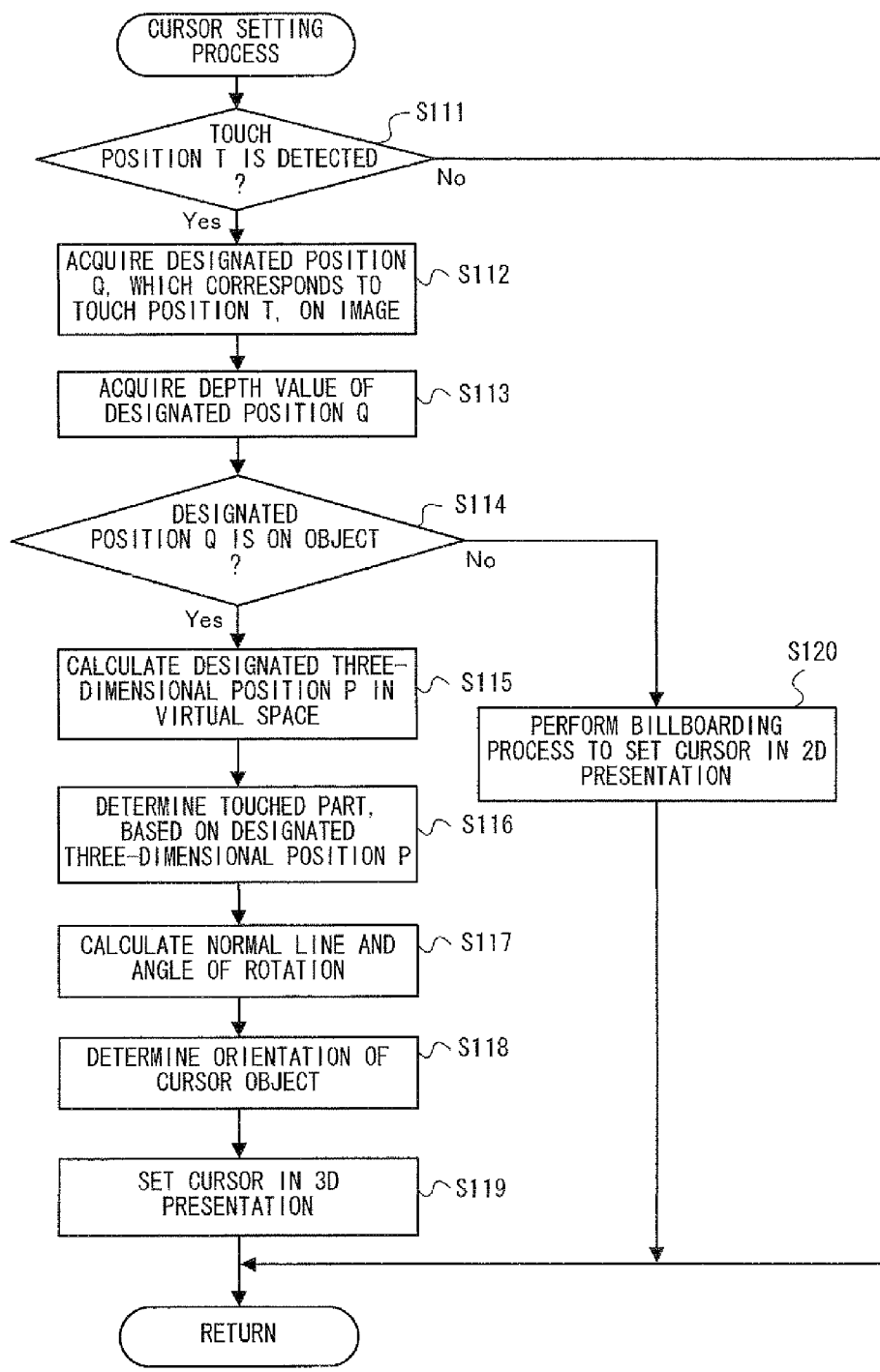
FIG. 8 is a flow chart showing in detail a cursor setting process (step S101)

The description of processes, which does not directly relate to the present invention, is omitted in FIG. 7. A processing loop of step S101 through step S104 shown in FIG. 7 is repeatedly executed for each frame (for example, 1/30 second or 1/60 seconds, which is referred to as a frame time).

Initially, in step S101, the information processing section 31 executes a cursor setting process. Here, the position in the virtual space and the orientation of the cursor 60 are calculated based on the touch position detected by the touch panel 13. The cursor setting process performed in step S101 will be described in detail, with reference to FIG. 8. FIG. 8 is a flowchart showing in detail the cursor setting process (step S101).

In step S111, the information processing section 31 determines whether or not the touch panel 13 has detected the touch position T. If the touch panel 13 has detected the touch position T, the information processing section 31 stores the touch position T (Tx, Ty) in the touch position data 71 as latest touch position, and executes a process of step S112. On the other hand, if the touch position T is not detected by the touch panel 13, the information processing section 31 ends the cursor setting process shown in FIG. 8.

In step S112, the information processing section 31 acquires a designated position Q on the image, which corresponds to the touch position T detected in step S111 on the touch panel 13. Here, the designated position Q indicates a position, on the image displayed on the lower LCD 12, which corresponds to the touch position T. Specifically, the information processing section 31 transforms the coordinates of the touch position T detected by the touch panel 13 in step S111 to acquire the designated position Q (Qx, Qy) on the image.

If the display screen (and the touch panel 13) of the lower LCD 12 and the image displayed on the lower LCD 12 (that is, an image generated in step S104 described below) have the same size as each other, the touch position T coincides with the designated position Q. On the other hand, if the image displayed on the lower LCD 12 is greater in size than the display screen of the lower LCD 12 (and the touch panel 13), the touch position T is converted according to a ratio of the size, and the designated position Q is obtained. As described above, the touch position T and the designated position Q, which correspond to each other in a one-to-one fashion, indicate positions represented by two different coordinate systems, respectively.

Hereinafter, the position, which is detected by the touch panel 13, and which is represented by the coordinate system of the touch panel 13, is denoted as the "touch position T", and the position, which corresponds to the touch position T, and which is represented by the coordinate system of the image displayed on the lower LCD 12, is denoted as the "designated position Q". Also, the position, which corresponds to the designated position Q, and which is represented by the coordinate system (the XYZ coordinate system) of the three-dimensional virtual space, is denoted as the "designated three-dimensional position P". The information processing section 31 next executes a process of step S113.

In step S113, the information processing section 31 acquires the depth value (a Z value) in the designated position Q. Specifically, the information processing section 31 refers to the depth value data 73 to acquire the depth value of the pixel at the designated position Q (Qx, Qy). In step S104 described below, the depth value (the position in the depth direction) for each pixel of the image is stored in the depth value data 73, when the image is displayed on the lower LCD 12. Here, the information processing section 31 refers to the depth value data 73 updated in a previous frame in step S104 to acquire the depth value stored in the depth value data 73. Next, a process of step S114 is executed.

In step S114, the information processing section 31 determines whether or not the designated position Q is on the dog object 50. That is, the information processing section 31 determines whether or not the designated position Q acquired in step S112 falls within the silhouette image 50B of the dog object 50 displayed on the lower LCD 12. For example, the information processing section 31 refers to the depth value data 73 to determine whether or not the depth value of the pixel at the designated position Q falls within a predetermined range. As described above, the depth value data 73 is the data which indicates the depth values of respective pixels of the image displayed on the lower LCD 12. In the image displayed on the lower LCD 12, merely the dog object 50 to be operated is displayed. Therefore, the depth value (0.9 through 1.0, for example) in the predetermined range is stored in the depth value data 73 for each pixel in an area (a display area of the silhouette image 50B) in which the dog object 50 is displayed, and a predetermined depth value (0, for example) is stored in the depth value data 73 for an area in which the dog object 50 is not displayed. Thus, the information processing section 31 can determine whether or not the dog object 50 has been touched by using the depth value data 73. If the determination result is affirmative, a process of step S115 is next executed. If the determination result is negative, a process of step S120 is next executed.

In step S115, the information processing section 31 calculates the designated three-dimensional position P (X, Y, Z). Specifically, the information processing section 31 calculates the designated three-dimensional position P in the virtual space, based on the designated position Q (Qx, Qy) acquired in step S112 and the depth value (the Z value) acquired in step S113. The designated position Q is the position on the image displayed on the lower LCD 12. The positions in the up-down and left-right directions (the X-axis and Y-axis directions in the camera coordinate system), in which the virtual space is viewed from the third virtual camera, are calculated, based on the designated position Q. The depth value acquired in step S113 is the depth value at the designated position Q on the image displayed on the lower LCD 12, and represents a position in the depth direction (the imaging direction; Z-axis direction in the camera coordinate system) in which the virtual space is viewed from the third virtual camera. Thus, the position in the depth direction of the third virtual camera is calculated based on the depth value. That is, the three-dimensional position in the virtual space is converted to a two-dimensional position on the image by a viewing transformation and a projective transformation. Therefore, the three-dimensional position in the virtual space can be obtained by a reverse transformation which uses the two-dimensional position (the positions in the up-down and left-right directions of the third virtual camera) on the image and its depth value (the position in the imaging direction of the third virtual camera). More specifically, the information processing section 31 uses an inverse matrix of a perspective projection transformation matrix and an inverse matrix of a viewing matrix of the third virtual camera to calculate the designated three-dimensional position P (X, Y, Z) in the virtual space. The information processing section 31 then stores the calculated designated three-dimensional position P in the RAM as the cursor data 75. Next, the information processing section 31 executes a process of step S116.

In step S116, the information processing section 31 determines the touched part, based on the designated three-dimensional position P. The dog object 50 is formed by a plurality of parts, and the touched part is determined in step S116.

Figure 9:
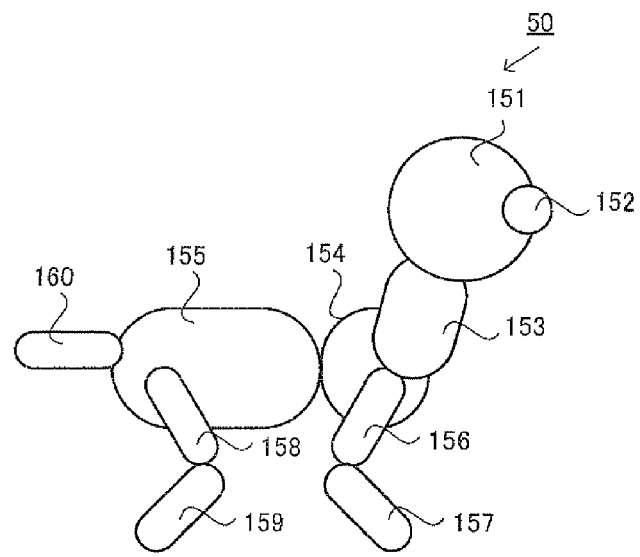
FIG. 9 is a diagram illustrating how the dog object 50 is formed of a plurality of parts.
Figure 10:
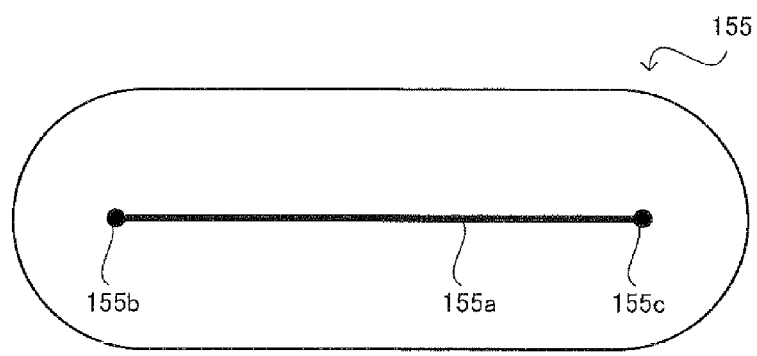
FIG. 10 is a diagram illustrating in detail a part 155 of the rear half of the dog object 50.

FIG. 9 is a diagram illustrating a state in which the dog object 50 is formed by the plurality of parts. As shown in FIG. 9, the dog object 50 is formed by the plurality of parts, and a part 151 forms the head, and a part 155 forms a rear half of the dog, for example. In the dog object information data 74, information regarding each part is included. Each part has a spherical shape, a cylindrical shape, a capsule shape (the part 155 shown in FIG. 9, for example), or the like. More specifically, each part is represented by a line segment (bone), and defined by determining a distance from the line segment to a point on a surface of the part. FIG. 10 is a diagram illustrating in detail the part 155, which is the rear half of the dog. As shown in FIG. 10, the part 155 is represented by a line segment 155a which connects a point 155h and a point 155c. Information regarding the part 155, among the dog object information data 74 includes the position and length (coordinate values of the point 155b and the point 155c in the three-dimensional virtual space) of the line segment 155a, and a distance from the line segment 155a to a point on the surface of the part 155.

The information processing section 31 refers to the dog object information data 74 to search for a line segment (bone) closest to the designated three-dimensional position P, thereby determines the touched part. Next, the information processing section 31 executes a process of step S117.

In step S117, the information processing section 31 calculates a normal line at the designated three-dimensional position P and an angle of rotation. Specifically, the information processing section 31 calculates a line, which passes through the designated three-dimensional position P, and which is normal to the surface of the touched part.

Figure 11A:
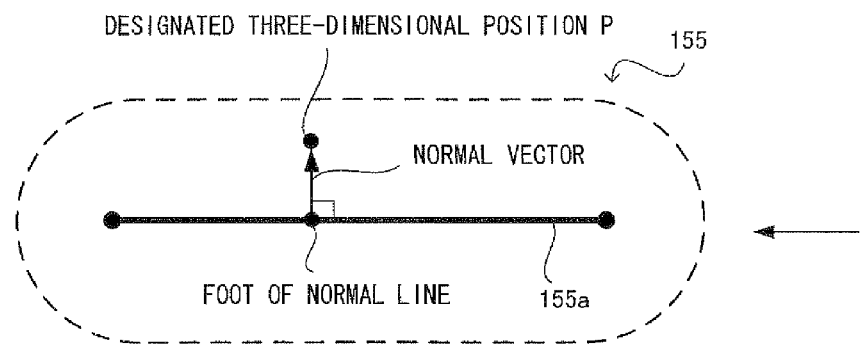
FIG. 11A is a diagram of the touched part 155 viewed from the front thereof, illustrating a normal vector on the part 155 at a designated three-dimensional position P.
Figure 11B:
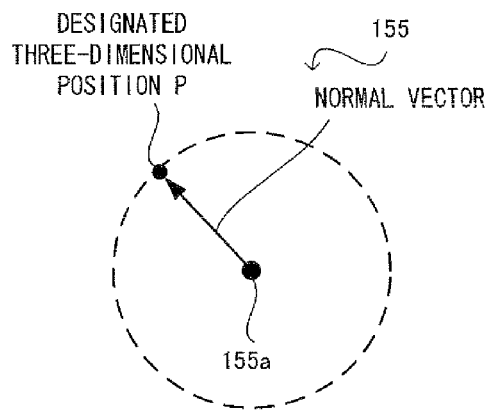
FIG. 11B is a diagram of the part 155 viewed from a direction as indicated by an arrow shown in FIG. 11A, illustrating the normal vector on the part 155 at the designated three-dimensional position P.

FIG. 11A is a diagram of the touched part 155 viewed from the front thereof, and illustrates a normal vector at the designated three-dimensional position P on the part 155. FIG. 11B is a diagram of the part 155 viewed from a direction as indicated by an arrow shown in FIG. 11A, and illustrates the normal vector at the designated three-dimensional position P on the part 155. As shown in FIG. 11A and FIG. 11B, the information processing section 31 calculates a foot of the normal line extending from the designated three-dimensional position P toward the line segment 155a in order to calculate a vector extending from the foot of the normal line toward the designated three-dimensional position P as the normal vector. The normal vector calculated as such is a vector normal to the surface of the part 155. A method of calculating the normal line at the designated three-dimensional position. P on the touched part is not limited to as described above and may be any method.

Figure 12:
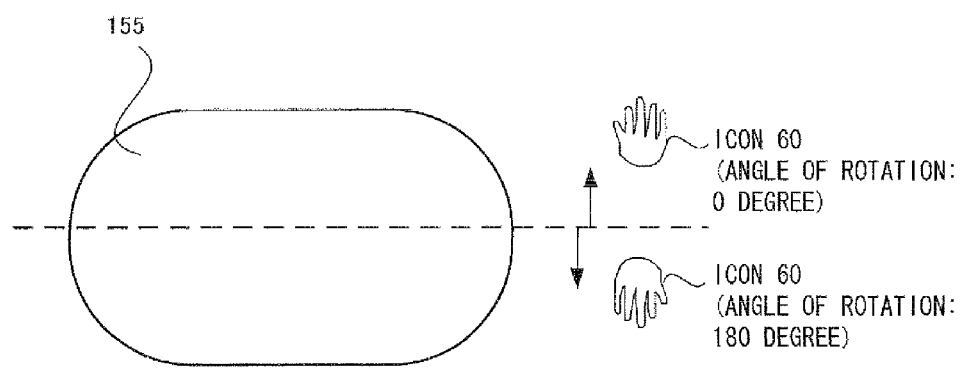
FIG. 12 is a diagram illustrating a determination of an angle of rotation of an icon 60, depending on an area in which the designated three-dimensional position P exists in the part 155, when the part 155 is touched.

In step S117, the information processing section 31 calculates the angle of rotation of the cursor 60, based on the designated three-dimensional position P. The angle of rotation of the cursor 60 to be calculated here is an angle which indicates rotation about the normal vector. The angle of rotation of the cursor 60 is determined based on the designated three-dimensional position P relative to the touched part. FIG. 12 is a diagram illustrating, in the case where the part 155 has been touched, how the angle of rotation is determined depending on the location of the designated three-dimensional position P in an area in the part 155. As shown in FIG. 12, for example, if an upper half of the part 155 has been touched, the angle of rotation of the cursor 60 is set to 0 degree. If a lower half of the part 155 has been touched, the angle of rotation of the cursor 60 is set to 180 degrees.

After the calculation of the normal line and the angle of rotation, the information processing section 31 executes a process of step S118.

In step S118, the information processing section 31 determines the orientation of the cursor 60 in the virtual space, based on the normal line and the angle of rotation calculated in step S117. Specifically, the information processing section 31 arranges the cursor 60 in the virtual space such that the cursor 60 is normal to the normal line calculated in step S117, and rotates the cursor 60 about the normal line by the angle of rotation calculated in step S117. The information processing section 31 then stores the determined orientation in the RAM as the cursor data 75. When the orientation of the cursor 60 is thus detected and the cursor 60 is displayed on the upper LCD 22, the cursor 60 is displayed so as to be along the surface of the part touched by the user (such that the palm contacts the surface of the part). The information processing section 31 next executes a process of step S119.

In step S119, the information processing section 31 sets the cursor 60 to 3D mode. Specifically, the information processing section 31 sets data which indicates a display mode of the cursor 60 to 3D display mode and stores the data in the RAM. The cursor 60 is stereoscopically displayed on the upper LCD 22 by performing a display process (step S103) described below for the upper LCD 22. In this case, the cursor 60 is displayed so as to be along the surface of the touched part, and for example, when the touched part is displayed in a front direction with respect to the screen of the upper LCD 22, the cursor 60 is also displayed so as to be arranged in the front direction with respect to the screen. After the process of step S119, the information processing section 31 ends the process of the flowchart shown in FIG. 8.

On the other hand, in step S120, the information processing section 31 sets the cursor 60 to 2D mode. Specifically, the information processing section 31 sets the data which indicates the display mode of the cursor 60 to 2D display mode, and stores the data in the RAM. The cursor 60 is displayed on the upper LCD 22 by the display process (step S103) described below for the upper LCD 22 being performed.

Figure 13:
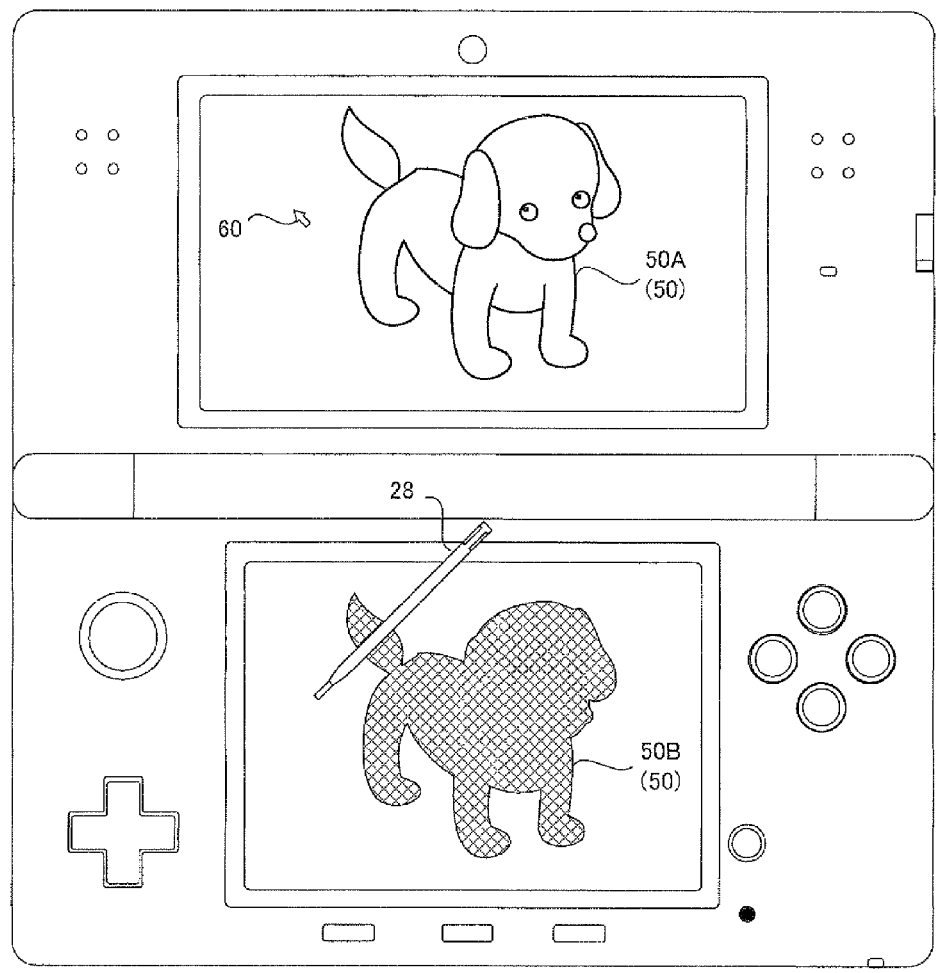
FIG. 13 is a diagram illustrating an example of the screens in which the dog object 50 is not touched when the touch panel 13 detects a touch.

FIG. 13 is a diagram illustrating an example of screens in the case where the dog object 50 is not touched when the touch panel 13 has detected a touch. As shown in FIG. 13, if an area different from the display area of the silhouette image 50B of the dog object 50 is touched, the cursor 60 is displayed on the upper LCD 22 at a position corresponding to the touch position T (the designated position Q). Here, the billboarding process is performed on the cursor 60, and the cursor 60 is displayed as a planar arrow-shaped cursor. Moreover, the cursor 60 is displayed so as to be arranged on the screen of the upper LCD 22 (that is, when the image for the left eye and the image for the right eye are displayed on the upper LCD 22, the display position of the cursor 60 in the image for the left eye coincides with the display position of the cursor 60 in the image for the right eye). After the process of step S120 is performed, the information processing section 31 ends the process of the flowchart shown in FIG. 8.

Returning to FIG. 7, the information processing section 31 executes a process of step S102 after the process of step S101.

In step S102, the information processing section 31 determines the movement of the dog object 50. Specifically, on the basis of the touch position T (the designated position Q) acquired in step S101, the information processing section 31 determines an operation performed on the dog object 50 and determines the movement of the dog object 50 according to the determination result. Next, the information processing section 31 executes a process of step S103.

In step S103, the information processing section 31 performs the display process for the upper LCD 22. Specifically, the information processing section 31 causes the dog object 50 to move according to the determination made in step S102. Furthermore, the information processing section 31 arranges the cursor 60 in the virtual space, according to the result of the cursor setting process made in step S101. For example, if the setting has been made in the cursor setting process to set the cursor to 3D mode (that is, if the process of step S119 has been performed), the cursor object 60 is arranged in the virtual space in the orientation determined in step S118 at the designated three-dimensional position P calculated in step S115. The information processing section 31 then takes images of the dog object 50, the ball object 51, and the cursor object 60 by the virtual stereo camera (the virtual cameras at the left and at the right; the first and the second cameras) set in the virtual space. Thus, the image for the left eye and the image for the right eye taken of the virtual space including the dog object 50, the ball object 51, and the cursor object 60 are generated. The information processing section 31 then outputs the generated the image for the left eye and the image for the right eye to the upper LCD 22. Next, the information processing section 31 executes a process of step S104.

In step S104, the information processing section 31 performs the display process for the lower LCD 12. Specifically, the information processing section 31 takes the image of the dog object 50 by using the virtual camera (the third virtual camera) arranged at the middle position between the virtual cameras at the left and at the right which are the components of the virtual stereo camera Here, the dog object 50 is set in silhouette display, and other objects, which are the ball object 51 and the cursor object 60, are set hidden. Therefore, merely the silhouette image 50B of the dog object 50 is displayed on the lower LCD 12. More specifically, the information processing section 31 uses the viewing matrix of the virtual camera (the third virtual camera) to perform the viewing transform on the coordinates of the dog object 50 represented in the XYZ coordinate system and further performs the projective transformation on the dog object 50 by using a projection matrix. Therefore, the image (the silhouette image 50B shown in FIG. 4 and FIG. 5) of the dog object 50 taken by the third virtual camera is generated. In addition, the information processing section 31 stores the depth value (the Z value), which is obtained by generating the image, in the RAM as the depth value data 73. The information processing section 31 then outputs the generated image to the lower LCD 12. The third virtual camera is not necessarily set at the middle between the virtual cameras at the left and at the right, which are the components of the virtual stereo camera, and may be set at any position between the virtual cameras at the left and at the right. This is the end of the description of the flowchart shown in FIG. 7.

The order of the process is riot limited to the one shown in FIG. 7, and for example, the cursor setting process may be performed after the respective display processes for the upper LCD and the lower LCD. Although, in the above description, the cursor 60 is arranged in the virtual space by using the depth value of the image already displayed on the lower LCD 12, in order to arrange the cursor 60 in the virtual space, the third virtual camera may be used to take the image of the virtual space, and thereby the image and the depth value may be generated. That is, the image of the virtual space may be taken by the third virtual camera before the cursor setting process is performed, and, by using the taken image and the depth value, the cursor 60 may be arranged in the virtual space. After the cursor 60 is arranged in the virtual space, the image of the virtual space may be again taken by the third virtual camera, and the taken image may be displayed on the lower LCD 12.

As described above, in the present embodiment, the touch position T is detected by the touch panel 13, and by using the designated position Q on the image, which corresponds to the touch position T, and the depth value of the designated position Q, the designated three-dimensional position P in the virtual space is obtained. The cursor 60 is then arranged at the designated three-dimensional position P. The orientation of the cursor 60 is set based on the normal line on the touched part at the designated three-dimensional position P. Therefore, the cursor 60 can be arranged in the virtual space at the position corresponding to the designated position Q.

In the present embodiment, because the designated three-dimensional position P in the virtual space is calculated by using the depth value calculated in the display process for the lower LCD 12, the position, which corresponds to the touch position T, in the three-dimensional virtual space can be obtained without the necessity of complex calculations. For example, to obtain the position in the three-dimensional virtual space, which corresponds to the touch position T detected by the touch panel 13, it is considered to obtain the position in the three-dimensional virtual space by geometric calculations. That is, a three-dimensional straight line extending from the touch position T toward the imaging direction of the virtual camera is calculated to determine whether or not the three-dimensional straight line contacts with any of the parts of the dog object 50. If there is a part with which three-dimensional straight line contacts, a point at which the part and three-dimensional straight line intersects with each other is obtained as the position, which corresponds to the touch position T, in the three-dimensional virtual space. However, in such a geometric method, the calculation becomes complex and thus the processing burden increases. For example, if a portion, which connects the parts each other, is touched, unless the designated three-dimensional position P is accurately obtained, the cursor 60 may be hidden when displayed on the screen, depending on the part on which the cursor 60 exists. Therefore, the designated three-dimensional position P needs to be accurately obtained. However, in geometric methods, the more accurately the designated three-dimensional position P must be obtained, the more strictly the shape of a virtual model (the dog object) needs to be defined. Thus, geometric methods require more complex calculation to more accurately obtain the designated three-dimensional position P, causing an increase in the processing burden. On the other hand, according to the method of the present embodiment, because the depth value, which is obtained in the display process, is used, no special calculation is required to accurately obtain the designated three-dimensional position P in the three-dimensional virtual space, which corresponds to the touch position T detected by the touch panel 13. Furthermore, because the designated three-dimensional position P is calculated by using the designated position Q on the image already displayed and the depth value at the designated position Q of the image, the calculated designated three-dimensional position P is a portion of the touched part which is displayed on the screen. Therefore, calculating the designated three-dimensional position P by using the method according to the present embodiment to arrange and display the cursor 60 at the designated three-dimensional position P displays the cursor 60 on the surface of the part.

Also, in the present embodiment, the cursor 60 is displayed so as to be along the surface of the touched part. That is, in the present embodiment, the orientation of the cursor 60 is determined based on the normal line of the part, at the designated three-dimensional position P, of the dog object 50. The cursor 60 is displayed by being arranged in the three-dimensional virtual space so as to be along the surface of the part, which is designated by the user, of the dog object 50, thereby giving the user a feel of touching the dog object 50.

(Modification)

In the present embodiment, the silhouette image of the dog object 50 is displayed on the lower LCD 12, and the stereoscopic image of the dog object 50 is displayed on the upper LCD 22. In another embodiment, a planar image may be displayed on the upper LCD 22, instead of the stereoscopic image. Also, the same image as displayed on the upper LCD 22 may be displayed on the lower LCD 12, instead of the silhouette image.

Further, in the present embodiment, the designated three-dimensional position P in the virtual space is calculated by using the depth value of the image displayed on the lower LCD 12. In another embodiment, the designated three-dimensional position P may be calculated by using the depth value of either of the image for the left eye and the image for the right eye which are displayed on the upper LCD 22.

Further, in the present embodiment, the depth value for each pixel of the image displayed on the lower LCD 12 is stored. In another embodiment, the depth value for each pixel needs not to be stored, and the depth value for each partial area formed of the plurality of pixels (a small rectangular area formed of four pixels, for example) may be stored.

Further, in another embodiment, the game apparatus 10 may be configured to include a single screen, instead of two screens. For example, the stereoscopic image (or the planar image) of the dog object 50 may be displayed on the display screen, and a position on the image (screen) may be designated by using a position designating means (a touch pad, a mouse, or the like, for example), which is different from the touch panel 13. Alternatively, a touch panel (the position designating means) may be provided on the screen of the game apparatus 10 configured to include the single screen, and a stereoscopic image may be displayed on the screen. In this case, the designated three-dimensional position in the three-dimensional virtual space is calculated, based on the designated position, which is designated by the position designating means, on the image (either of the image for the left eye and the image for the right eye, or the image taken by the virtual camera set between the virtual cameras at the left and at the right) and the depth value of the designated position. The cursor object 60 is then arranged at the calculated designated three-dimensional position and the image of the cursor object 60 is taken by the virtual camera, and thereby the cursor object 60 is displayed on the upper LCD 22.

Further, the game apparatus 10 may be configured to include a single screen, and the single screen may be divided in two areas. For example, in one of the two areas of the screen, a color image (the color image may or may not be a stereoscopic image) of the dog object 50 may be displayed, and in another of the two areas of the screen, the silhouette image of the dog object 50 may be displayed. The user may designate a position on the silhouette image displayed in the another of the two areas.

Further, in the present embodiment, the normal line of the designated part, among the plurality of pats of the dog object 50, is calculated, and the cursor object 60 formed in a hand shape is arranged such that the cursor object 60 is normal to the normal line. The cursor object 60 is then rotated about the normal line, according to the position on the designated part (the designated three-dimensional position relative to the designated part). In another embodiment, the angle of rotation of the cursor object 60 may be determined with consideration, for example, of the direction of movement of the cursor 60, or the like. For example, if the cursor 60 moves in the left-right directions of the screen, the cursor 60 may be rotated 90 degrees about the normal line.

Further, in another embodiment, not only the dog object 50, any game object (which is formed of one or more parts) may be displayed on the screen and the game object may be operated (given an instruction) by using the cursor 60.

Further, in the present embodiment, the cursor 60, which indicates the position designated by the user, is displayed. In another embodiment, any object, which is not limited to the cursor 60, may be arranged in the virtual space for display. That is, the designated three-dimensional position may be calculated based on the position designated by the user and the depth value of the designated position, and any object may be arranged at the calculated designated three-dimensional position.

Further, in another embodiment, the above-described display control method may be applied, not limited to the game apparatus, but also to any electronic apparatus, for example, PDA (Personal Digital Assistant), advanced mobile phones, personal computers, and the like.

Further, in another embodiment, the game apparatus is not limited to the hand-held game apparatus, and may be a stationary game apparatus including an input device for designating a position on the screen. This game apparatus displays a video on a television receiver (hereinafter, referred to as a television) or the like, and includes the input device for designating a position on a screen of the television. For example, by receiving the infrared radiation emitted from a marker section provided on the periphery of the television, the input device detects the position designated by the user on the television screen. Alternatively, the input device may emit the infrared radiation and a photodetector provided on the periphery of the television receives the infrared radiation emitted from the input device, and thereby the game apparatus detects the position designated by the user. As described above, the three-dimensional position in the virtual space may be calculated, and thereby the object may be arranged in the three-dimensional position by using the position designated on the screen by the user by the use of the input device, and the depth value (the depth value of the image displayed on the screen) of the position.

Further, in the present embodiment, the LCD capable of displaying the stereoscopic images which can be viewed by the naked eye is employed. In another embodiment, the present invention is applicable to viewing the stereoscopic images by means of glasses having the time division scheme or the deflecting scheme, the anaglyphic format (the red-blue glasses format), or the like.

Further, in another embodiment, the processes may be divided and performed by a plurality of information processing apparatuses communicatively connected by wire or wirelessly to each other, and thereby the display control system, which realizes the above display control method, may be constructed. For example, the position designating means, which is used by the user for designation of the position, may be configured to be separated from the information processing apparatus, and connected to the information processing apparatus wirelessly, or the like. The information processing apparatus and the display device may also be connected to each other, being configured to be separated from each other.

Further, the game process described above may be applied to online games. For example, the display device and the position designating means (such as the touch panel or the mouse), which designates a position on a screen of the display device, may be connected to a terminal, and the terminal and the server are connected to each other via the Internet to execute the game. In such online game, while the game advances by distributing processes between the terminal and the server, the processes may be distributed in any manner. For example, a game space may be built in the server, and the position of the dog object 50 in the game space is managed on the server. The user may use the position designating means to designate a position on the screen of the display device, while viewing an image displayed on the display device. For example, the terminal may acquire the position (the designated position Q) on the image displayed on the screen and the depth value at the position, based on the position (the touch position T) detected by the position designating means, and transmit, to the server, information including the position on the image and the depth value. On the basis of the information, the server may calculate the three-dimensional position in the virtual space and arrange the cursor object 60 in the virtual space (arrange the position and set the orientation of the cursor 60). Next, the server may cause the dog object 50 to move to change the position in the virtual space and the orientation of the dog object 50, and additionally, transmit, to the terminal, the information regarding the position and the orientation of the dog object and the information regarding the position and the orientation of the cursor object 60. On the basis of these pieces of information, the terminal may arrange the dog object and the cursor object in the virtual space, take an image of the virtual space by using the virtual camera, and display the taken image on the display device.

Further, in the present embodiment, the processes in the flow charts described above are performed by the information processing section 31 of the game apparatus 10 executing a predetermined program. In another embodiment, a part or the entirety of the processes may be performed by a dedicated circuit included in the game apparatus 10.

Further, the game program (information processing program) may be provided to the game apparatus 10 by being stored in, but not limited to the memory, but also in a computer-readable storage medium such as optical discs or magnetic discs. For example, the program may be stored in a RAM (storage medium) in a server on a network, and the program is provided to the game apparatus 10 by the game apparatus 10 connected to the network.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein a display control program having computer-executable code or instructions which, when executed by one or more processors of a computerized display control, causes the display control to function and perform operations comprising:
   generating an image in which depth values are set, by taking a two-dimensional image of a three-dimensional virtual space by a virtual camera and setting depth values that are associated with each pixel position of the image;
   acquiring an associated depth value for a pixel of the image corresponding to a designated position on the image, wherein the designated position on the image is provided by a user via an input touch position designation;
   calculating, based on a depth value associated to the designated position on the image, a spatial position in a depth direction in the virtual space as viewed from the virtual camera;
   producing a virtual designating object at the calculated spatial position in the depth direction in the virtual space; and
   displaying, on a first display area, a first image taken of the virtual space which includes the virtual designating object produced therein and displaying a second image on a second display area, the second image being based upon the first image, wherein the input touch position designation is provided via a second display area, which is different from the first display area and which is capable of detecting a touch position on the second display area, and wherein the depth value is acquired based upon the touch position and a corresponding pixel position in the second image displayed on the second display area.

2. The non-transitory computer-readable storage medium having stored therein the display control program according to claim 1, wherein
   the calculated spatial position corresponds to a designated three-dimensional position in the virtual space, based on both the designated position on the image and the depth value of the image at the designated position, and wherein the display control program causes the display control to perform operations comprising:
   producing the virtual designating object at the designated three-dimensional position in the virtual space.

3. The non-transitory computer-readable storage medium having stored therein the display control program according to claim 2, wherein
   the designated three-dimensional position in the virtual space is calculated based on a location of the designated position on the two-dimensional image in up-down and left-right directions in the virtual space as viewed from the virtual camera and the depth value associated with the designated position.

4. The non-transitory computer-readable storage medium having stored therein the display control program according to claim 2, wherein
   the designating object is a cursor object indicating a position within the virtual space.

5. The non-transitory computer-readable storage medium having stored therein the display control program according to claim 4, wherein the display control program causes the display control to perform operations comprising:
   producing a second virtual object to be displayed in the virtual space,
   generating an image by taking, via the virtual camera, an image of the virtual space including the second object, and
   in the case where the designated position exists in an area in which the second object is displayed, determining, based on the designated three-dimensional position, an orientation of the designating object, and arranging in the virtual space the designating object in the determined orientation.

6. The non-transitory computer-readable storage medium having stored therein the display control program according to claim 5, wherein
   the second object is formed of a plurality of parts,
   the display control program further causes one or more processors of the display control to function and perform operations comprising:
   determining, based on the designated position, a designated part from among the plurality of parts of the second object, and
   determining the orientation of the designating object, according to the designated part, and arranging the designating object in the virtual space in the determined orientation.

7. The non-transitory computer-readable storage medium having stored therein the display control program according to claim 6, wherein
   arranging an object further includes determining an orientation of the designating object, according to a normal line of the designated part at the designated three-dimensional position.

8. The non-transitory computer-readable storage medium having stored therein the display control program according to claim 7, wherein
   each of the plurality of parts of the second object is formed of a bone formed of either of a point and a line segment, and
   arranging an object further includes calculating a normal vector extending from a point on the bone, at which a distance between the designated three-dimensional position and the bone is shortest, toward the designated three-dimensional position, and determining the orientation of the designating object, according to the normal vector.

9. The non-transitory computer-readable storage medium having stored therein the display control program according to claim 7, wherein
the display control program further causes said one or more processors to function and perform operations comprising:
setting an angle of rotation of the designating object according to the designated three-dimensional position relative to the designated part, and
rotating the designating object about the normal line by the angle of rotation to arrange the designating object in the virtual space.

10. The non-transitory computer-readable storage medium having stored therein the display control program according to claim 5, wherein
the display control displays the designating object in different modes, depending on whether or not the designated position exists within the area in which the second object is displayed.

11. The non-transitory computer-readable storage medium having stored therein the display control program according to claim 5, wherein
in the case where the designated position exists within the area in which the second object is displayed, calculating the designated three-dimensional position in the virtual space based on the designated position and the depth value of the image at the designated position, and
in the case where the designated position exists outside of the area in which the second object is displayed, calculating the designated three-dimensional position in the virtual space based on the designated position and a constant depth value.

12. The non-transitory computer-readable storage medium having stored therein the display control program according to claim 2, wherein
the display area is displayable in a stereoscopically visible manner, and
the display control program causes the display control to perform operations comprising:
generating an image for a left eye and an image for a right eye by taking images of the virtual space by a virtual stereo camera,
acquiring either of a depth value at the designated position on the image for the left eye or the image for the right eye, and a depth value at the designated position on a third image acquired by taking an image of the virtual space by a third virtual camera having the same imaging direction as that of the virtual stereo camera, and
stereoscopically displaying, on the display area, an image taken of the virtual space including the object arranged therein by the object arranging means.

13. The non-transitory computer-readable storage medium having stored therein the display control program according to claim 12, wherein
the third virtual camera is set between a virtual camera at the left and a virtual camera at the right which are components of the virtual stereo camera, and
the display control program causes the display control to perform operations of:
acquiring the depth value of the third image at the designated position on the third image, and
calculating the designated three-dimensional position based on the designated position on the third image and the depth value of the third image.

14. The non-transitory computer-readable storage medium having stored therein the display control program according to claim 13, wherein
the third virtual camera is set at a middle location between the virtual camera at the left and the virtual camera at the right which are the components of the virtual stereo camera.

15. The non-transitory computer-readable storage medium having stored therein the display control program according to claim 12, wherein
a position designator is provided via a second display area, which is different from the first display area, and which detects a touch position on the second display area, and
the display control program further causes said one or more processors to function and perform operations comprising:
generating a third image which is acquired by taking an image of the virtual space by a third virtual camera having the same imaging direction as that of the virtual stereo camera,
acquiring a depth value on the third image at a designated position corresponding to the touch position,
and wherein the display control displays, on the display area, the image for the left eye and the image for the right eye, and displays, on the second display area, the third image.

16. A display control apparatus comprising:
image generator that generates a two-dimensional image, in which depth values are set in association with each pixel position of the two-dimensional image, by taking an image of a three-dimensional virtual space by a virtual camera;
depth value acquirer that acquires a depth value associated to pixel position a position designated by a user on the two-dimensional image via an input touch position designation;
one or more processors configured to calculate, based on an acquired depth value, a spatial position in a depth direction in the virtual space as viewed by the virtual camera;
designating object generator that produces a virtual designating object in the virtual space at the calculated spatial position in the depth direction; and
display controller that displays on a first display area a first image taken of the virtual space which includes the virtual designating object produced therein and which displays a second image on a second display area, the second image being based upon the first image, wherein the input touch position designation is provided via a second display area, which is different from the first display area and which is capable of detecting a touch position on the second display area, and wherein the depth value is acquired based upon the touch position and a corresponding pixel position in the second image displayed on the second display area.

17. A display control system comprising:
a processing system, including at least one computer processor, the processing system being configured to:
generate a two-dimensional image, in which depth values are set, by taking an image of a three-dimensional virtual space by a virtual camera and setting depth values that are associated with each pixel position of the two-dimensional image;
acquire an associated depth value for a pixel of the image corresponding to a designated position on the image, wherein the designated position on the image is provided by a user via an input device touch position designation;

calculate, using said at least one processor, a spatial position in a depth direction in the virtual space as viewed by the virtual camera based on a depth value associated to the designated position on the image;

produce a virtual designating object at the calculated spatial position in the depth direction in the virtual space; and display, on a first display area, a first image taken of the virtual space which includes the virtual designating object produced therein and display a second image on a second display area, the second image being based upon the first image, wherein the input touch position designation is provided via a second display area, which is different from the first display area and which is capable of detecting a touch position on the second display area, and wherein the depth value is acquired based upon the touch position and a corresponding pixel position in the second image displayed on the second display area.

18. A display control method implemented using an information processing apparatus having one or more processors for controlling a displaying of an image on a display device, the method comprising:

generating a two-dimensional image, in which depth values are set, by taking a two-dimensional image of a three-dimensional virtual space by a virtual camera and setting depth values which are associated with each pixel position of the image;

acquiring the associated depth value for a pixel of the image at a designated position on the image, wherein the designated position on the image is provided by a user via an input device touch position designation;

calculating, using said one or more processors, based on a depth value associated to the designated position on the image, a spatial position in a depth direction in the virtual space as viewed by the virtual camera;

producing a virtual designating object at the calculated spatial position in the depth direction in the virtual space; and displaying, on a first display area, a first image taken of the virtual space which includes the virtual designating object produced therein and displaying a second image on a second display area, the second image being based upon the first image, wherein the input touch position designation is provided via a second display area, which is different from the first display area and which is capable of detecting a touch position on the second display area, and wherein the depth value is acquired based upon the touch position and a associated pixel position in the second image displayed on the second display area.

19. A non-transitory computer-readable storage medium having stored therein a display control program having computer-executable code or instructions which, when executed by one or more processors of a computerized display control, causes the display control to function and perform operations comprising:

generating an image in which depth values are set, by taking a two-dimensional image of a three-dimensional virtual space by a virtual camera and setting depth values to be associated with each pixel position of the image;

acquiring an associated depth value for a pixel of the image corresponding to a designated position on the image, wherein the designated position on the image is provided via an input device;

calculating, based on the depth value of the designated position on the image, a spatial position in a depth direction in the virtual space as viewed from the virtual camera, wherein the calculated spatial position corresponds to a designated three-dimensional position in the virtual space, based on both the designated position on the image and the depth value of the image at the designated position;

producing the virtual designating object at the designated three-dimensional position in the virtual space;

producing a second virtual object to be displayed in the virtual space, wherein the second object is formed of a plurality of parts;

generating an image by taking, via the virtual camera, an image of the virtual space including the second object and, if the designated position exists in an area in which the second object is displayed, determining, based on the designated three-dimensional position, an orientation of the designating object;

determining, based on the designated position, a designated part from among the plurality of parts of the second virtual object;

determining the orientation of the designating object according to the designated part and arranging the designating object in the virtual space in the determined orientation; and displaying, on a first display area, an image taken of the virtual space which includes the virtual designating object arranged therein, wherein the designating object is a cursor object indicating a position within the virtual space.

20. A non-transitory computer-readable storage medium having stored therein a display control program having computer-executable code or instructions which, when executed by one or more processors of a computerized display control, causes the display control to function and perform operations comprising:

generating an image in which depth values are set, by taking a two-dimensional image of a three-dimensional virtual space by a virtual camera and setting depth values to be associated with each pixel position of the image;

acquiring an associated depth value for a pixel of the image corresponding to a designated position on the image, wherein the designated position on the image is provided via an input device;

calculating, based on the depth value of the designated position on the image, a spatial position in a depth direction in the virtual space as viewed from the virtual camera, wherein the calculated spatial position corresponds to a designated three-dimensional position in the virtual space, based on both the designated position on the image and the depth value of the image at the designated position;

producing the virtual designating object at the designated three-dimensional position in the virtual space;

producing a second virtual object to be displayed in the virtual space;

generating an image by taking, via the virtual camera, an image of the virtual space including the second object; and if the designated position exists in an area in which the second object is displayed, determining, based on the designated three-dimensional position, an orientation of the designating object and arranging in the virtual space the designating object in the determined orientation; and if the designated position exists within the area in which the second object is displayed, calculating the designated three-dimensional position in the virtual space based on the designated position and the depth value of the image at the designated position; and if the designated position exists outside of the area in which the second object is displayed, calculating the designated three-dimensional position in the virtual space based on the designated position and a constant depth value; and displaying, on a first display area, an image taken of the virtual space which includes the virtual designating object arranged therein, wherein the designating object is a cursor object indicating a position within the virtual space.

* * * * *